UNITED STATES PATENT OFFICE.

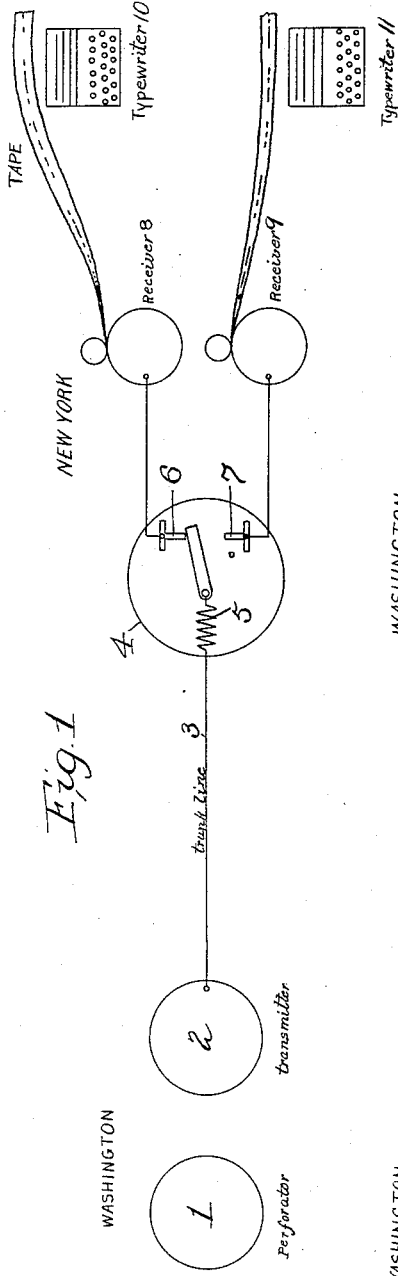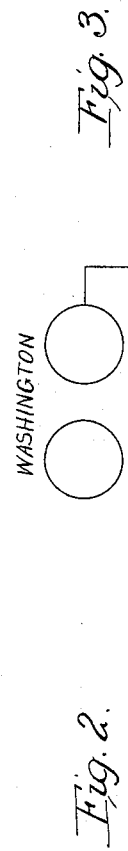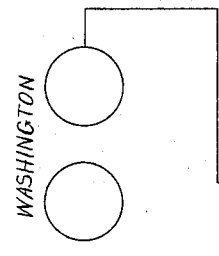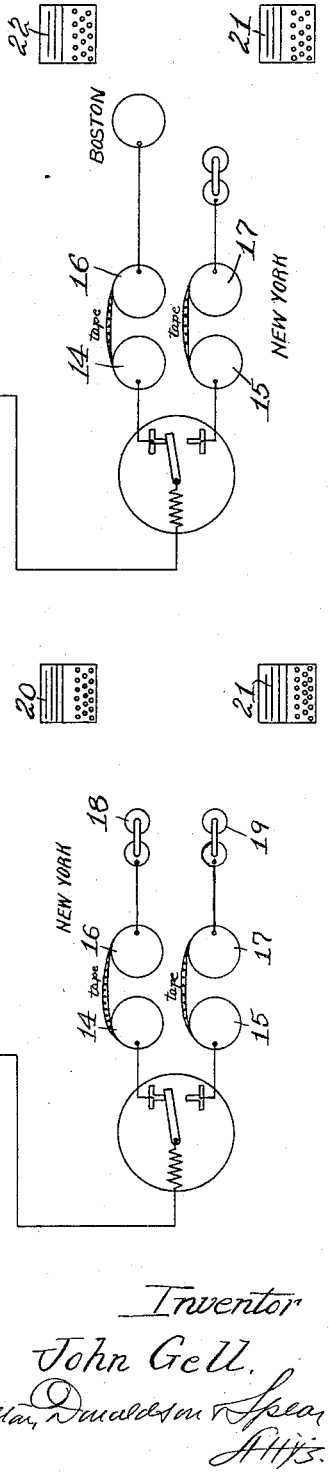

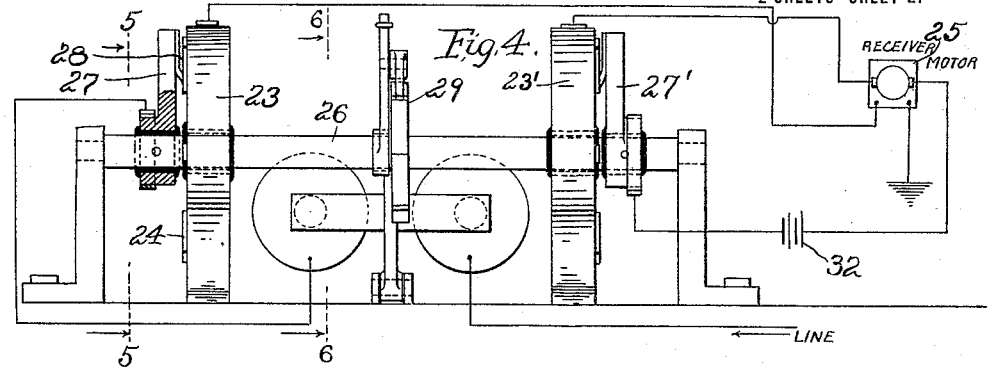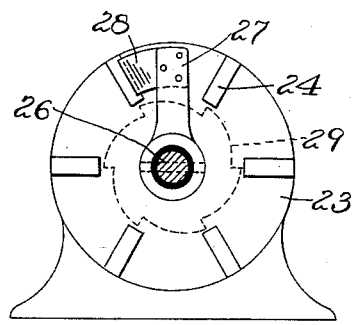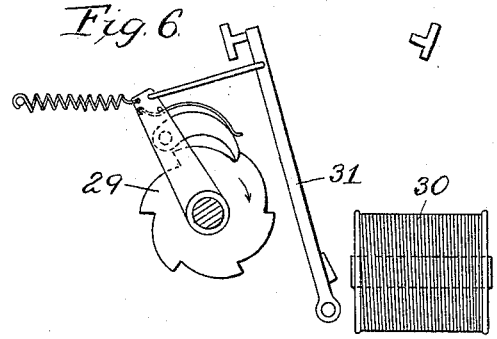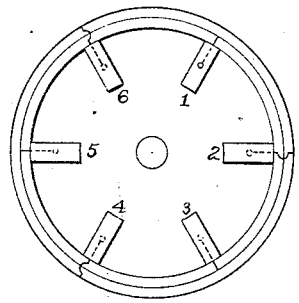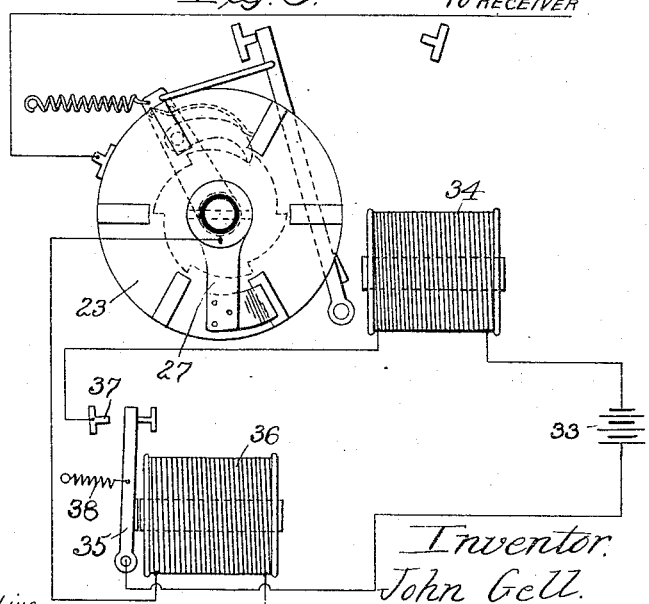

JOHN GELL, OF LONDON, ENGLAND.

TELEGRAPHIC TRANSMISSION.

1,199,262. Specification of Letters Patent. Patented Sept. 26, 1916.

Application filed March 8, 1911, Serial No. 613,080. Renewed February 15, 1916. Serial No. 78,549.

*To all whom it may concern:*

Be it known that I, JOHN GELL, a subject of the King of Great Britain, and resident of London, England, have invented certain new and useful Improvements in Telegraphic Transmission, of which the following is a specification.

The object of my invention is to obtain a high speed of transmission over the line wire, automatic distribution, at the receiving end, to two or more receiving instruments connected to line *seriatim* so the transcribing or translating from these receiving instruments may be done by different receiving operators at a speed within the working capacity of the said respective receiving operators. This has heretofore been attempted by means of wheels at the sending and receiving stations rotating rapidly and synchronously, and with a series of segments so arranged as to momentarily place the line wire in connection successively with each of a series of transmitting and receiving instruments.

In my system the line wire is connected for a definite period of time to successive receiving instruments, which enables a continuous tape to be used for each receiving instrument, to be filed for future reference, and dispenses with the operator who at present, on high speed circuits, tears the tape into sections and manually distributes them.

Other features of my invention will be made clear in the following description and claims.

Although I do not limit myself to the use of my present invention in connection with Gell apparatus, I will, for convenience, describe it in connection therewith.

In the accompanying drawings Figures 1, 2 and 3 are diagrammatic views of systems for carrying my invention into effect; Fig. 4 is a side view in the nature of a diagram of the switch at the receiving station and the electrical connections; Fig. 5 is a sectional view of Fig. 4 on the line 5—5; Fig. 6 is a sectional view of Fig. 4 on line 6—6; Fig. 7 is a diagram of the switch disk showing its alternate switch contacts connected electrically, making a two-way switch from a disk having six contact blocks, so that by adjusting these connections the switch disk may be used with two receivers or with six receivers, or other forms of connections may be used to make a three-way switch to serve three receivers; Fig. 8 is a view of a modified form of automatic switch at the receiving station.

In Fig. 1, 1 represents a Gell perforator which the operator is manipulating at, say, sixty words per minute. The tape passes directly into 2, which is a Gell transmitter working also at sixty words per minute, and sending the signals onto line 3 at that rate of speed. 4 represents a reversing switch of any suitable construction, controlled by a sluggish electro-magnet 5 which, when actuated, diverts the line current through contacts 6 and 7, alternately into the respective tape receiving instruments 8 and 9. Magnet 5 is so arranged that it is not actuated by moderately rapid alternating currents or by a moderately rapid succession of currents of the same polarity; but is actuated by a current of more lengthened duration or of a special character.

Let us assume that the operator at Washington is sending a number of telegrams to New York, at too great a speed for one operator to receive them, but that he desires that the two operators in New York shall take a message in turn alternately or as the sending operator may determine on account of any differences in the lengths of the telegrams or otherwise. When the operator has completed the first message, which is actuating receiver 8, he will depress a special key and cause a lengthened signal or one of a special character to be sent to New York, which will cause the switch 4 to divert the incoming current into New York's receiving instrument 9, and in like manner the third message will be diverted to receiver 8. The received slip from 8 is passed in front of the typewriter 10 worked by a typist there, and in the same manner tape from receiver 9 passes in front of typewriter 11 and is transcribed by another typist. It will be clear from the above that if the operator works the perforator 1 at Washington at sixty words per minute, the receiving instruments 8 and 9 will work at the same speed, but at alternate intervals, so that the two receiving typists will only have to work continuously at thirty words per minute to keep pace with the one sending operator working continuously at sixty words per minute. The receivers 8 and 9 may be of the Gell ink recording tape character. The special signal sent by the transmitting operator may be done by a special signal perforated in the transmitting tape.

Fig. 2 represents the same system but with reperforators at 14 and 15 in place of ink recording tape receivers such as used at 8 and 9 in Fig. 1. These reperforators cut a series of holes either corresponding to or similarly identical with the outgoing tape at Washington from perforator 1. This reperforated tape passes through retransmitters 16 and 17 at a speed of, say, thirty words per minute, and these retransmitters 16 and 17 actuate sounders 18 and 19 from which typists 20 and 21 record the messages.

In place of the ink receivers or reperforators, any other type of apparatus may be actuated, and in place of the signals from retransmitters 16 and 17 actuating local sounders, the current from the retransmitters 16 and 17 can be diverted to other cities, and so avoid the cost of manual retransmission. Such a system is illustrated in Fig. 3, in which the retransmitter 16 sends the message, received at New York, on to Boston.

I have hitherto referred to a two-way switch so placed that a unidirection pull will alternately divert the current into two different circuits. It is clear that by having a rotary arm with a number of contacts associated with a number of circuits then by means of a step by step or other motion I can successively divert the line current into a series of circuits in succession.

I have referred to the operation of the switch 4 by means of a lengthened current or one of a special character sign. It may also be operated by the absence of any current in the main circuit, owing to a blank interval on the tape at the end of successive messages or where required.

I have shown the main line currents working the receiving apparatus. This form may be used or local circuits introduced in the well known manner.

It will be understood in all cases where I refer to receiving instruments that they may be ink recording tape, perforated tape or any other suitable form of receiving apparatus whether of tape character or not. It will be further understood that the automatic action of the switch at the receiving station is controlled from the transmitting station, and this control may result from sending a signal over the line or from the cessation of the sending signals at the transmitting station.

As one form of automatic switch adapted to carry out my invention, reference is made to Figs. 4, 5 and 6, in which a switch disk 23 having, say, six contacts 24 on its face from which connections lead off to different receivers, one of which is indicated conventionally at 25. This disk is mounted on a fixed foot or standard, and is insulated from a shaft 26 which carries an arm 27 insulated therefrom, said arm having a brush or contact 28 to engage the contacts of the disk or plate 23. The shaft is turned by a pawl and ratchet mechanism at 29 in turn operated by an electro-magnet and armature lever 30, 31, said electro-magnet being connected with the line in series with the switch arm. For driving the motor of the receiving instrument, a local battery 32 is employed having one terminal connected with a controlling switch arm 27' mounted in the shaft 26 but insulated therefrom, said arm, like the arm 27, working over the face of a standard or disk 23' having contacts on its face equal in number to those on the disk 23 connected individually with the motors of the different receivers to drive the medium which receives the record as, for instance, the tape. The line wire from the switch at 23 connects with the mechanism of the receiver which operates the recording wheel, stylus or other recording element, and thence the line is connected with earth. From this it will be seen that the switch arm 27 will connect with the line first one receiver and then another, according as the said arm closes contact with the contacts on the disk or standard 23, and at the same time the arm 27' will close the circuit of local battery to drive the motor of the receiving instrument selected by the arm 27, the motors of all the other receiving instruments remaining at rest, as well as their recording elements or members.

While I have shown a switch adapted to connect with six receiving instruments in succession, I have also shown in Fig. 7 how this switch may be converted into a two-way or three-way switch by connecting up the contacts thereof. For a two-way switch, for instance, I connect segments or contacts 1, 3 and 5 together, and also 2, 4 and 6, in like manner, and in the same way for a three-way switch I would connect contacts 1 and 4; 2 and 5; and 3 and 6.

In Fig. 8 I show a modification of the automatic switch, adapted to be operated by the cessation of the signals impressed on the line. In this form the arm 27 and contact supporting disk or standard 23 are employed substantially the same as in the form first described. The pawl and ratchet mechanism, however, instead of being controlled from a signal or impulse of special character or duration sent over the line from the transmitting station is controlled from a local battery 33 in open circuit with an electro-magnet 34, and a circuit closing lever 35, which in turn is controlled by an electro-magnet 36 in circuit with the line which normally holds the said lever 35 away from contact 37 against the power of its spring 38. Upon the cessation of the signals, for a prescribed duration, the electro-magnet 36 will allow the spring 38 to close the contact at 37, thus energizing electro-magnet 34 and operating the pawl and ratchet mechanism to turn the shaft with the switch arm to connect with another receiver. The motor of this receiver is controlled from a local battery, and switch arm 27', as in the form first described. When signals are sent over the line again, the magnet 36 will be energized to break the local circuit so that the pawl lever, under the action of its spring, may set itself in position for a new action.

I have described two forms of switches to indicate that my invention, in its broad features, is not limited to any particular switch mechanism, and the same is true as to the character of the instruments used at the transmitting and receiving stations.

I claim as my invention:

1. A system of transmitting messages consisting in means for impressing the messages upon the line at a comparatively high speed, and means whereby said messages may be divided for transcribing or translation at a lower speed, consisting of a plurality of recording receiving instruments with means controlled from the transmitting station for switching out and stopping one recording receiver and switching into the line and starting another recording receiver, each taking its assignment of the message or messages while that taken by the other receiver is being translated, substantially as described.

2. A system of transmitting messages consisting in means for impressing the messages upon the line at a comparatively high speed, and means whereby said messages may be divided for transcribing or translation at a lower speed, consisting of a plurality of recording receiving instruments with means automatically controlled from the transmitting station for switching out and stopping one recording receiver, and switching into the line and starting another recording receiver, each taking its assignment of the message or messages while that taken by the other receiver is being translated, substantially as described.

3. The herein described method of transmitting a telegraph message or messages from a transmitting to a receiving station, which consists in impressing such message or messages at the transmitting station upon a line, and during such transmission dividing them up at the receiving station by alternately switching them into a plurality of receivers whereby the message or messages may be transmitted from the transmitting station at a speed in excess of the capacity of any one receiver at the receiving station.

4. A telegraphic system having a transmitting instrument, a plurality of receivers at one receiving station, a motor for each receiver and a duplex switch at the said receiving station controlled from the transmitting station to switch the line current from one receiver to another and to energize the motor of the connected receiver, substantially as described.

5. A telegraphic system having a transmitting instrument and a plurality of receiving instruments, a motor for each receiver, a local battery for energizing the motors, and a duplex switch controlled from the transmitting station, one member of which switches the line current from one receiver to another and the other member of which connects the motor of said receiver with the local battery.

6. A telegraphic system comprising a transmitting instrument, a plurality of receivers, motors therefor, local battery connections with the motors, and a duplex switch comprising a rotary shaft having a contact arm working over a plurality of contacts to switch the line current from one receiver to another and a second arm on said shaft working over contacts to connect the motor of the selected receiver with the local battery, and electro-magnetically operated means in the line circuit for operating the said shaft, substantially as described.

In testimony whereof, I affix my signature in presence of two witnesses.

JOHN GELL.

Witnesses:
EDUARD N. SARTON,
BENNETT S. JONES.